(12) United States Patent
Kang et al.

(10) Patent No.: US 8,579,491 B2
(45) Date of Patent: Nov. 12, 2013

(54) BACKLIGHT UNIT AND DISPLAY APPARATUS HAVING THE SAME

(75) Inventors: Eui Jeong Kang, Asan-si (KR); Juhwa Ha, Asan-si (KR); Hyeeun Park, Suwon-si (KR); Cheolyong Noh, Cheonan-si (KR); Seung Hwan Baek, Seoul (KR); Yong-Hoon Kwon, Asan-si (KR)

(73) Assignee: Samsung Display Co., Ltd. (KR)

( * ) Notice: Subject to any disclaimer, the term of this patent is extended or adjusted under 35 U.S.C. 154(b) by 202 days.

(21) Appl. No.: 13/191,834

(22) Filed: Jul. 27, 2011

(65) Prior Publication Data

US 2012/0201050 A1 Aug. 9, 2012

(30) Foreign Application Priority Data

Feb. 8, 2011 (KR) ........................ 10-2011-0011147

(51) Int. Cl.
*F21V 7/04* (2006.01)

(52) U.S. Cl.
USPC ........... 362/621; 362/612; 362/631; 362/634; 349/69

(58) Field of Classification Search
USPC ..................... 362/612, 621, 630–634; 349/69
See application file for complete search history.

(56) References Cited

U.S. PATENT DOCUMENTS

| 4,698,730 | A | * | 10/1987 | Sakai et al. | 362/311.05 |
| 5,381,309 | A | * | 1/1995 | Borchardt | 362/612 |
| 7,566,159 | B2 | | 7/2009 | Oon et al. | |

FOREIGN PATENT DOCUMENTS

| JP | 2006-229007 A | 8/2006 |
| KR | 1020060058596 A | 5/2006 |
| KR | 10-0770688 B1 | 10/2007 |
| KR | 1020070099903 A | 10/2007 |
| KR | 10-0928635 B1 | 11/2009 |

\* cited by examiner

*Primary Examiner* — Jason Moon Han
(74) *Attorney, Agent, or Firm* — Cantor Colburn LLP

(57) ABSTRACT

A display apparatus includes a light guide plate, a light source unit and a display panel. The light guide plate includes an incident surface, an exit surface and an opposite surface opposite to the exit surface and guides a light incident into the incident surface toward the exit surface. The light source unit includes a light source which generates light and is disposed adjacent to the incident and has an emitting surface inclined with respect to the incident surface. An extension line of a normal line of the emitting surface passes through the opposite surface, and the light is incident into the incident surface while being inclined toward the opposite surface. The display panel displays an image by receiving the light emitted from the exit surface.

15 Claims, 13 Drawing Sheets

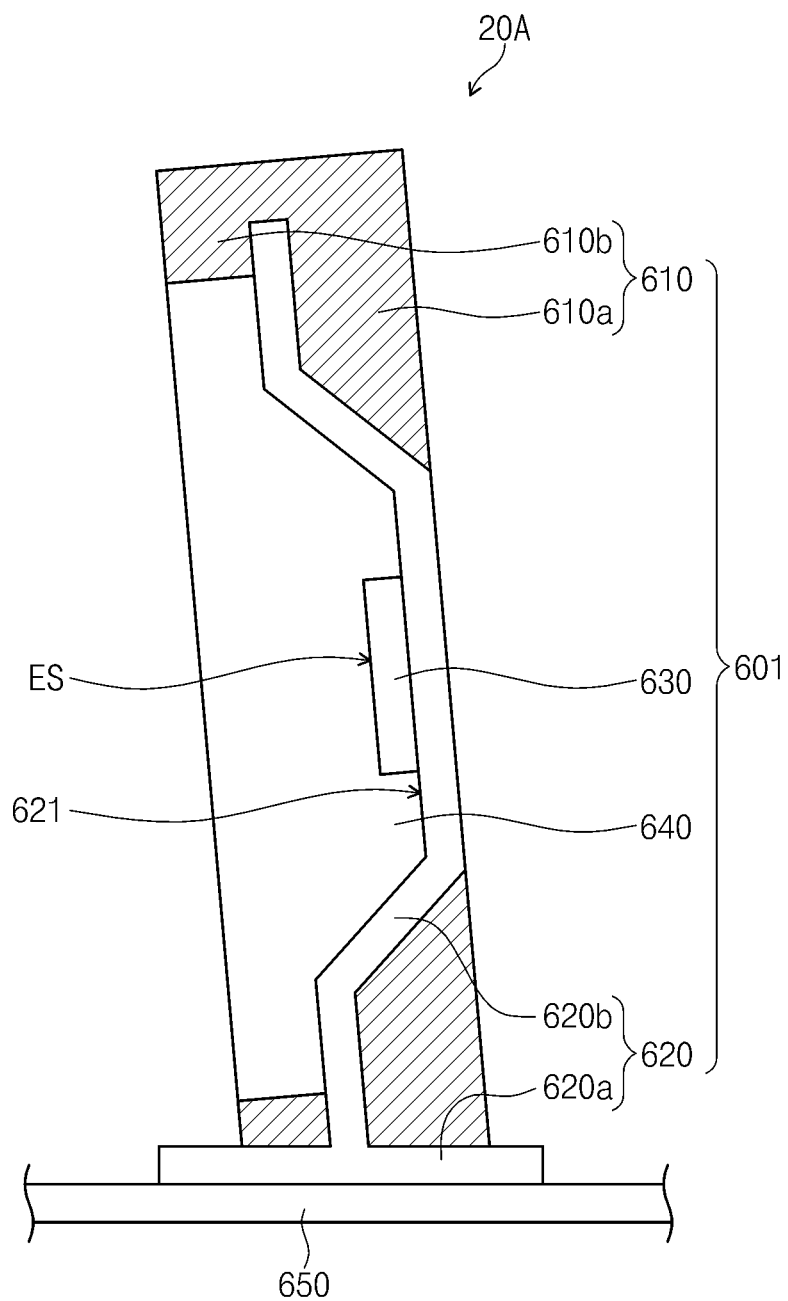

BACKLIGHT UNIT AND DISPLAY APPARATUS HAVING THE SAME

This application claims priority to Korean Patent Application No. 10-2011-0011147 filed on Feb. 8, 2011, and all the benefits accruing therefrom under 35 U.S.C. §119, the contents of which are herein incorporated by reference in their entirety.

BACKGROUND OF THE INVENTION

1. Field of the Invention

The invention relates to a backlight unit and a display apparatus having the same. More particularly, the invention relates to a backlight unit capable of preventing light leakage while improving the light incident efficiency from a light source to a light guide plate, and a display apparatus having the same.

2. Description of the Related Art

In general, a display apparatus includes a backlight unit to generate a light and a display panel to display the image by using the light.

A display apparatus for a notebook computer or a mobile device includes an edge-illumination type backlight unit having a light source, and a light guide plate to guide a light generated from the light source to a display panel. In addition, in the edge-illumination type backlight unit, the light source is positioned adjacent to an edge of the light guide plate to supply the light toward the light guide plate so that the light is guided to the display panel by the light guide plate.

BRIEF SUMMARY OF THE INVENTION

An exemplary embodiment of the invention provides a backlight unit capable of reducing or effectively preventing light leakage while improving the light incident efficiency from a light source to a light guide plate.

An exemplary embodiment of the invention also provides a display apparatus having such a backlight unit.

In one exemplary embodiment, a backlight unit includes a light guide plate and a light source unit.

The light guide plate includes an incident surface, an exit surface and an opposite surface opposite to the exit surface, and guides a light incident into the incident surface toward the exit surface. The light source unit includes a light source which generates light and is disposed adjacent to the incident surface and has an emitting surface inclined with respect to the incident surface. An extension line of a normal line of the emitting surface passes through the opposite surface, and the light is incident into the incident surface while being inclined toward the opposite surface.

In another exemplary embodiment, a display apparatus includes a light guide plate, a light source unit and a display panel.

The light guide plate includes an incident surface, an exit surface and an opposite surface opposite to the exit surface, and guides a light incident into the incident surface toward the exit surface. The light source unit includes a light source which generates light and is disposed adjacent to the incident surface and has an emitting surface inclined with respect to the incident surface. An extension line of a normal line of the emitting surface passes through the opposite surface, and the light is incident into the incident surface while being inclined toward the opposite surface. The display panel displays an image using the light emitted from the exit surface.

According to the exemplary embodiments of the backlight unit and the display apparatus having the same, the emitting surface of the light source is inclined with respect to the incident surface of the light guide plate so that the light emitted from the light source is supplied to the incident surface while being inclined with respect to the opposite surface of the light guide plate. Thus, direct emission of the light to the display panel from the light source can be reduced or effectively prevented. That is, light leakage can be reduced or effectively prevented, and the light incident efficiency, which is a ratio of the light incident into the light guide plate to the light emitted from the light source, can be improved.

BRIEF DESCRIPTION OF THE DRAWINGS

The above and other advantages of the invention will become readily apparent by reference to the following detailed description when considered in conjunction with the accompanying drawings wherein:

FIG. 4 is an enlarged cross-sectional view of another exemplary embodiment of a light source part shown in FIG. 1 according to the invention;

DETAILED DESCRIPTION OF THE INVENTION

Figure 1:
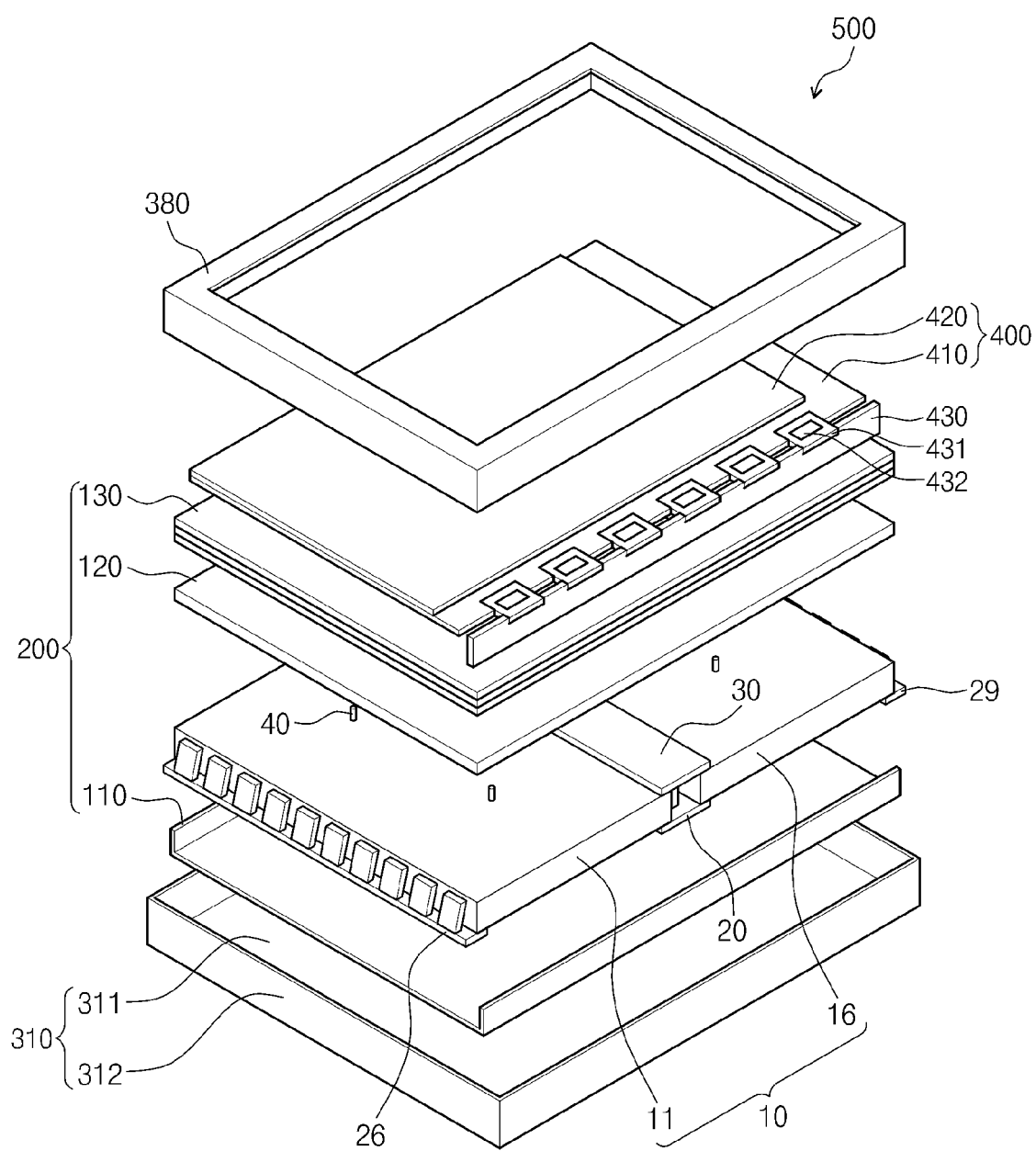
FIG. 1 is an exploded perspective view showing an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to"

another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of the invention will be described in detail with reference to accompanying drawings.

FIG. 1 is an exploded perspective view showing an exemplary embodiment of a display apparatus according to the invention.

Referring to FIG. 1, the display apparatus 500 includes a backlight unit 200, a display panel 400, a bottom chassis 310 and a top chassis 380.

The backlight unit 200 includes a first light source part 20, a second light source part 26, a third light source part 29, a light guide plate 10 having a first sub-light guide plate 11 and a second sub-light guide plate 16, a diffusion member 30, a reflective plate 110, a diffusion plate 120 and optical sheets 130.

The first to third light source parts 20, 26 and 29 generate light required for the display apparatus 500 to display an image. The light guide plate 10 guides the light generated from the first to third light source parts 20, 26 and 29 toward the display panel 400.

The relationship among the first to third light source parts 20, 26 and 29 and the first and second sub-light guide plates 11 and 16 and the traveling route of the light generated from each light source part are as follows.

The first light source part 20 is provided between the first and second sub-light guide plates 11 and 16 so that the light generated from the first light source part 20 is supplied toward the first and second sub-light guide plates 11 and 16. In addition, the second light source part 26 faces the first light source part 20 while interposing the first sub-light guide plate 11 therebetween so that the light generated from the second light source part 26 is supplied toward the first sub-light guide plate 11. The third light source part 29 faces the first light source part 20 while interposing the second sub-light guide plate 16 therebetween so that the light generated from the third light source part 29 is supplied toward the second sub-light guide plate 16.

According to one embodiment of the invention, the first to third light source parts 20, 26 and 29 can be individually driven, so that the lights generated from the first to third light source parts 20, 26 and 29 may have intensities different from each other and can be supplied to the first and second sub-light guide plates 11 and 16, independently. Thus, the intensity of the light supplied to the display panel 400 through the first and second sub-light guide plates 11 and 16 may vary depending on image display regions of the display panel 400. That is, the display apparatus 500 can be driven through the local dimming scheme.

The diffusion member 30 is provided between the first and second sub-light guide plates 11 and 16 to cover the first light source part 20, thereby diffusing the light that travels toward the display panel 400 by passing through and between the first and second sub-light guide plates 11 and 16.

The reflective plate 110 includes a material capable of reflecting the light, such as polyethylene terephthalate ("PET") or aluminum. The reflective plate 110 is provided on a bottom portion 311 of the bottom chassis 310 to reflect the light generated from the first to third light source parts 20, 26 and 29. As a result, the reflective plate 110 increases the intensity of the light supplied toward the display panel 400.

The diffusion plate 120 is disposed between the light guide plate 10 and the display panel 400. The diffusion plate 120 diffuses the light output from the light guide plate 10 and the light that has been diffused by the diffusion member 30. As a result, the intensity of the light in a unit area of the display panel 400 may be more uniform due to the diffusion plate 120.

According to one embodiment of the invention, the diffusion plate 120 is placed on support members 40 protruding from the light guide plate 10, and the diffusion plate 120 is spaced apart from the light guide plate 10 by the support members 40.

The optical sheets 130 are provided between the display panel 400 and the diffusion plate 120. The optical sheets 130 may include prism sheets to improve the front brightness by collecting the light output from the diffusion plate 120, and/or diffusion sheets to diffuse the light output from the diffusion plate 120.

According to one embodiment of the invention, the display panel 400 may be a liquid crystal display panel that displays the image by receiving the light generated from the backlight unit 200. The display panel 400 includes a first substrate 410, a second substrate 420 facing the first substrate 410 and liquid crystals (not shown) interposed between the first and second substrates 410 and 420.

According to one embodiment of the invention, the first substrate 410 includes a plurality of pixel electrodes (not shown), and a plurality of thin film transistors electrically connected to the pixel electrodes. Each thin film transistor switches a driving signal supplied to each pixel electrode. In addition, the second substrate 420 includes color filter layers corresponding to the pixel electrodes in one-to-one correspondence, and an opposite electrode that generates the electric field together with the pixel electrodes to control the alignment of the liquid crystals.

A printed circuit board 430 is provided at one side of the display panel 400 to output the driving signal to the display panel 400. The printed circuit board 430 is connected to the display panel 400 through a plurality of tape carrier packages ("TCP") 431, and a plurality of driving chips 432 are mounted on the TCP 431.

Each driving chip 432 may have a data driver (not shown) therein to output a data signal to the display panel 400. A gate driver (not shown), which outputs a gate signal to the display panel 400, can be directly on the display panel 400 through a thin film process. In addition, the driving chips 432 may be mounted on the display panel 400 in the form of chip on glass ("COG"). In this case, the driving chips 432 can be integrated in one chip.

The bottom chassis 310 includes the bottom portion 311 and sidewalls 312 extending from the bottom portion 311 so that a receiving space is defined in the bottom chassis 310 to receive the backlight unit 200 and the display panel 400. In addition, the top chassis 380 is coupled with the bottom chassis 310 in such a manner that the backlight unit 200 and the display panel 400 can be stably fixed in the bottom chassis 310.

Figure 2:
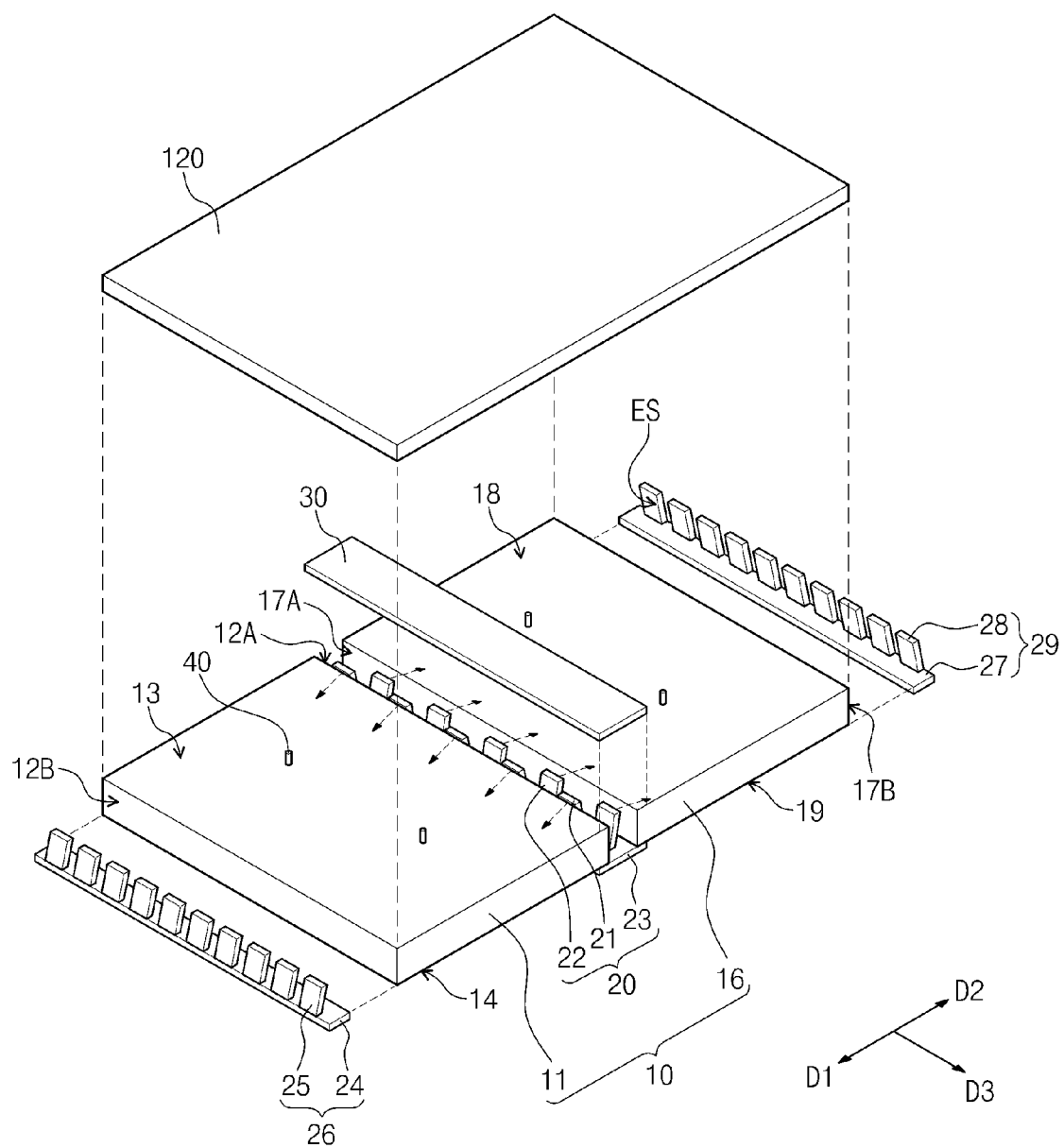
FIG. 2 is an exploded perspective view showing the relationship among first to third light source parts, a light guide plate and a diffusion plate shown in FIG. 1.
Figure 3A:
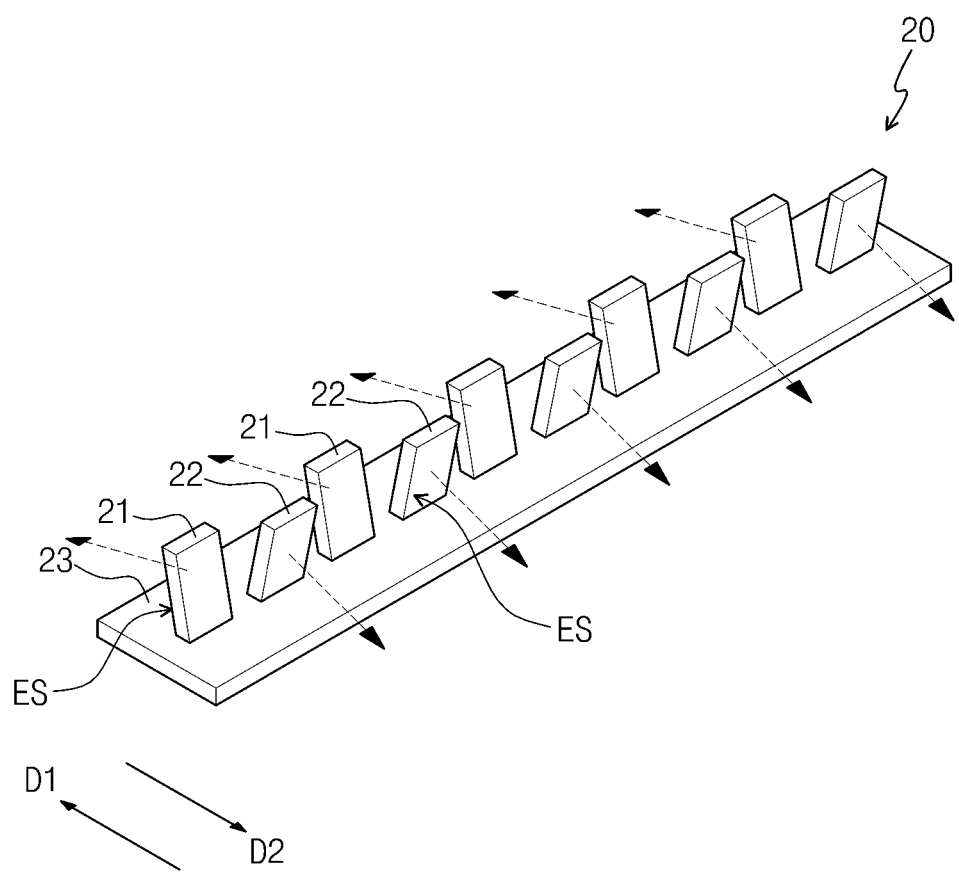
FIG. 3A is a perspective view of an exemplary embodiment of the first light source part shown in FIG. 2.
Figure 3B:
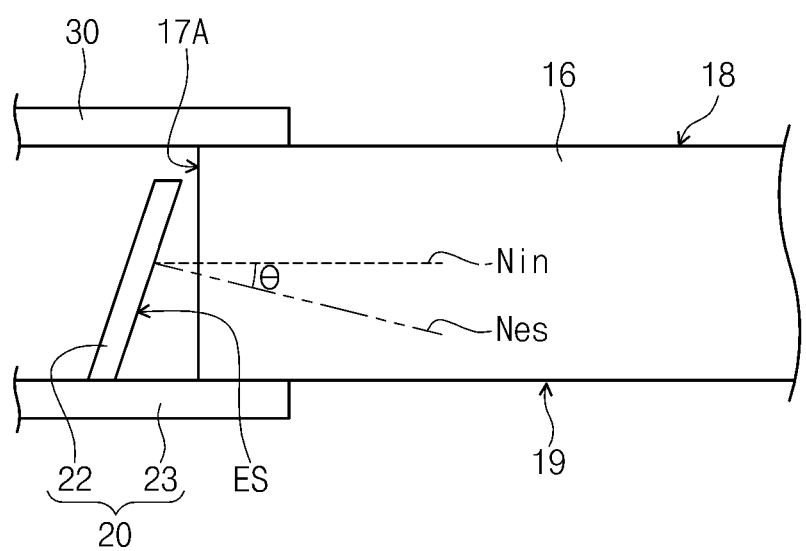
FIG. 3B is an enlarged side cross-sectional view showing the relationship between the first light source part shown in FIG. 3A and the light guide plate.

FIG. 2 is an exploded perspective view showing the relationship among the first to third light source parts 20, 26 and 29, the light guide plate 10 and the diffusion plate 120 shown in FIG. 1, FIG. 3A is a perspective view of the first light source part shown in FIG. 2, and FIG. 3B is an enlarged side cross-sectional view showing the relationship between the first light source part shown in FIG. 3A and the light guide plate 10.

Referring to FIG. 2, the light guide plate 10 includes the first and second sub-light guide plates 11 and 16 spaced apart from each other and aligned in the first direction D1. The diffusion plate 120 is disposed on the first and second sub-light guide plates 11 and 16. In addition, at least one of the first to third light source parts 20, 26 and 29 is positioned adjacent to each lateral side of the first and second sub-light guide plates 11 and 16 in the first direction D1. Hereinafter, the structure of the elements will be described in more detail.

According to one embodiment of the invention, the first sub-light guide plate 11 has a plate shape. The first sub-light guide plate 11 is provided at a first side thereof with a first incident surface 12A, and at a second side thereof opposing the first incident surface 12A with a second incident surface 12B. In addition, the first sub-light guide plate 11 has a first exit surface 13 connected to the first and second incident surfaces 12A and 12B, and a first opposite surface 14 opposite to the first exit surface 13.

In addition, the second sub-light guide plate 16 has a plate shape. The second sub-light guide plate 16 is provided at a first side thereof with a third incident surface 17A and at a second side thereof opposing the third incident surface 17A with a fourth incident surface 17B. In addition, the second sub-light guide plate 16 has a second exit surface 18 connected to the third and fourth incident surfaces 17A and 17B, and a second opposite surface 19 opposite to the second exit surface 18.

The first light source part 20 is provided between the first and second sub-light guide plates 11 and 16. The first light source part 20 includes a first printed circuit board 23, first light source units 21, and second light source units 22. The first printed circuit board 23 longitudinally extends in the third direction D3 perpendicular to the first direction D1 and between the first and second sub-light guide plates 11 and 16. When viewed from the top, at least a portion of the first printed circuit board 23 may overlap with the first and second sub-light guide plates 11 and 16. In addition, the first printed circuit board 23 is parallel to the first exit surface 13.

The first and second light source units 21 and 22 are electrically connected to the first printed circuit board 23. In addition, the first and second light source units 21 and 22 are alternately arranged on the first printed circuit board 23 along the third direction D3.

The traveling direction of the light generated from the first light source units 21 is different from the traveling direction of the light generated from the second light source units 22. In more detail, when viewed from the top, the light generated from the first light source units 21 substantially travels in the first direction D1, as indicated by the arrows in FIG. 2. As a result, the light generated from the first light source units 21 is supplied to the first sub-light guide plate 11 through the first incident surface 12A. In addition, the light generated from the second light source units 22 substantially travels in the second direction D2 opposite to the first direction D1, as indicated by the arrows in FIG. 2, so that the light generated from the second light source units 22 is supplied to the second sub-light guide plate 16 through the third incident surface 17A.

In detail, as shown in FIGS. 3A and 3B, the first light source units 21 are inclined toward the first sub-light guide plate 11 and the second light source units 22 are inclined toward the second sub-light guide plate 16. In other words, emitting surfaces ES of the first light source units 21 are inclined in opposition to the display panel 400 about the first incident surface 12A of the first sub-light guide plate 11, so an extension line of the normal line Nes of the emitting surfaces ES of the first light source units 21 extends to pass through the first opposite surface 14 opposite to the first exit surface 13. Thus, the first light source units 21 supply the light to the first incident surface 12A in such a manner that the light may be inclined in opposition to the display panel 400.

In this manner, if the light is supplied to the first incident surface 12A in a state in which the emitting surfaces ES of the first light source units 21 are inclined in opposition to the display panel 400, the intensity of the light traveling toward the diffusion member 30 through and between the first and second sub-light guide plates 11 and 16 may be reduced, and the quantity of the light incident into the first incident surface 12A may be increased.

Similar to the first light source units 21, the emitting surfaces ES of the second light source units 22 are inclined in opposition to the display panel 400 about the third incident surface 17A of the second sub-light guide plate 16, so the extension line of the normal line Nes of the emitting surfaces ES of the second light source units 22 extends to pass through the second opposite surface 19 opposite to the second exit surface 18. Thus, the second light source units 22 supply the light to the third incident surface 17A in such a manner that the light may be inclined in opposition to the display panel 400.

In more detail, as shown in FIG. 3B, the normal line Nes of the emitting surfaces ES of the second light source units 22 may form an angle θ with respect to the normal line Nin of the third incident surface 17A. The angle θ may be, for example, in the range of 0°<θ<45°.

Referring again to FIG. 2, the second light source part 26 is located adjacent to the second incident surface 12B to supply the light toward the first sub-light guide plate 11. The second light source part 26 includes a second printed circuit board 24 and third light source units 25. The second printed circuit board 24 longitudinally extends in the third direction D3 along the second incident surface 12B. When viewed from the top, at least a portion of the second printed circuit board 24 may overlap with the first sub-light guide plate 11. The third light source units 25 are electrically connected to the second printed circuit board 24 and arranged on the second printed circuit board 24 in the third direction D3. When viewed from the top, the light generated from the third light source units 25 substantially travels in the second direction D2 so that the light is supplied toward the first sub-light guide plate 11 through the second incident surface 12B.

In detail, emitting surfaces ES of the third light source units 25 are inclined in opposition to the display panel 400 so that the light is supplied to the second incident surface 12B while being inclined toward the first opposite surface 14.

The third light source part 29 is located adjacent to the fourth incident surface 17B to supply the light toward the second sub-light guide plate 16. The third light source part 29 includes a third printed circuit board 27 and fourth light source units 28. The third printed circuit board 27 longitudinally extends in the third direction D3 along the fourth incident surface 17B. When viewed from the top, at least a portion of the third printed circuit board 27 may overlap with the second sub-light guide plate 16. The fourth light source units 28 are electrically connected to the third printed circuit board 27 and arranged on the third printed circuit board 27 in the third direction D3. When viewed from the top, the light generated from the fourth light source units 28 substantially travels in the first direction D1 so that the light is supplied toward the second sub-light guide plate 16 through the fourth incident surface 17B.

In detail, emitting surfaces ES of the fourth light source units 28 are inclined in opposition to the display panel 400 so that the light is supplied to the fourth incident surface 17B while being inclined toward the second opposite surface 19.

As described above, the light guide plate 10 receives the light from the first to third light source parts 20, 26 and 29, and the light incident into the light guide plate 10 is output to the diffusion plate 120 through the first and second exit surfaces 13 and 18 due to reflective patterns (not shown) on the opposite surfaces 14 and 19 of the light guide plate 10.

The diffusion member 30 includes polymethylmethacrylate ("PMMA") or polycarbonate ("PC") and longitudinally extends in the third direction D3 to cover (e.g., overlap) the first light source part 20 between the first and second sub-light guide plates 11 and 16. In addition, when viewed from the top, the diffusion member 30 is disposed on the first and second sub-light guide plates 11 and 16 such that the diffusion member 30 may partially overlap with a portion of the first and second sub-light guide plates 11 and 16. The diffusion member 30 diffuses the light, which is generated from the first light source part 20 and travels toward the diffusion plate 120 through and between the first and second sub-light guide plates 11 and 16.

The first sub-light guide plate 11 may be expanded due to external environmental factors, such as temperature or humidity. In this regard, the first sub-light guide plate 11 may be spaced apart from the first light source units 12 while interposing an air layer therebetween. As a result, a portion of the light emitted from the emitting surface ES may not be supplied to the first incident surface 12A, but travels toward the diffusion plate 120 through and between the first and second sub-light guide plates 11 and 16. However, the light traveled toward the diffusion plate 120 is diffused by the diffusion member 30, so that the display quality of the display apparatus 500 (see, FIG. 1) may not be degraded.

FIG. 4 is an enlarged cross-sectional view of another exemplary embodiment of a light source part shown in FIG. 1 according to the invention.

Referring to FIG. 4, the light source part 20A includes a printed circuit board 650 and a light source unit 601. The light source unit 601 may include a light source 630 generating the light, a lead frame 620 having the light source 630 mounted thereon and connecting the light source 630 to the printed circuit board 650, and a housing 610 receiving the light source 630 and the lead frame 620.

The light source 630 may be a light emitting diode including two electrodes receiving voltages having polarities different from each other to generate the light according to the voltages applied to the two electrodes. In general, the emitting surface ES of the light source unit 601 is the same as the emitting surface ES of the light source 630. The emitting surface ES of the light source 630 is inclined toward the printed circuit board 650. In addition, the light source unit 601 is inclined with respect to the printed circuit board 650, and the extension line of the normal line of the emitting surface ES crosses an extension surface of the printed circuit board 650.

Although not shown in FIG. 4, the lead frame 620 includes first and second lead frames connected to the two electrodes of the light source 630, respectively, and spaced apart from each other. In FIG. 4, only one of the first and second lead frames is drawn.

The lead frame 620 includes a first frame 620a adjacent to the printed circuit board 650 and parallel to the printed circuit board 650, and a second frame 620b extending from the first frame 620a, having the light source 630 mounted thereon.

The first frame 620a protrudes out of the housing 610 and makes contact with the printed circuit board 650 to support the light source unit 601 and to electrically connect the light source 630 to the printed circuit board 650. The second frame 620b has a recess and the light source 630 is mounted in the recess. A mounting surface 621 of the recess for the light source 630 is not perpendicular to the printed circuit board 650, but inclined with respect to the printed circuit board 650. In detail, the mounting surface 621 of the recess for the light source 630 is inclined toward the printed circuit board 650.

The housing 610 includes a receiving part 610a to receive the light source 630 and the lead frame 620, and a support part 610b substantially perpendicularly extending from the receiving part 610a to cover at least a portion of the lead frame 620. The support part 610b supports the lead frame 620. The receiving part 610a may include an opening to expose a surface, which is opposite to the mounting surface 621 of the recess for the light source 630 in the second frame 620b. Since the surface, which is opposite to the mounting surface 621 of the recess for the light source 630 in the second frame 620b, is exposed to outside of the light source part 20A, heat generated from the light source 630 can be easily dissipated to the outside.

In addition, an outer surface of the receiving part 610a may be parallel to the mounting surface 621 of the recess for the light source 630 in the second frame 620b. Referring to FIG. 4, the mounting surface 621 of the recess for the light source 630 in the lead frame 620 and the receiving part 610a of the housing 610 are inclined toward the printed circuit board 650 in the light emitting direction of the light source unit 601. Thus, if the light source 630 is mounted on the lead frame 620, the emitting surface ES of the light source 630 is inclined toward the printed circuit board 650.

The light source unit 601 may further include a transparent filler 640 on the light source 630 and occupying an entire of the recess. The transparent filler 640 may include silicon.

Figure 5:
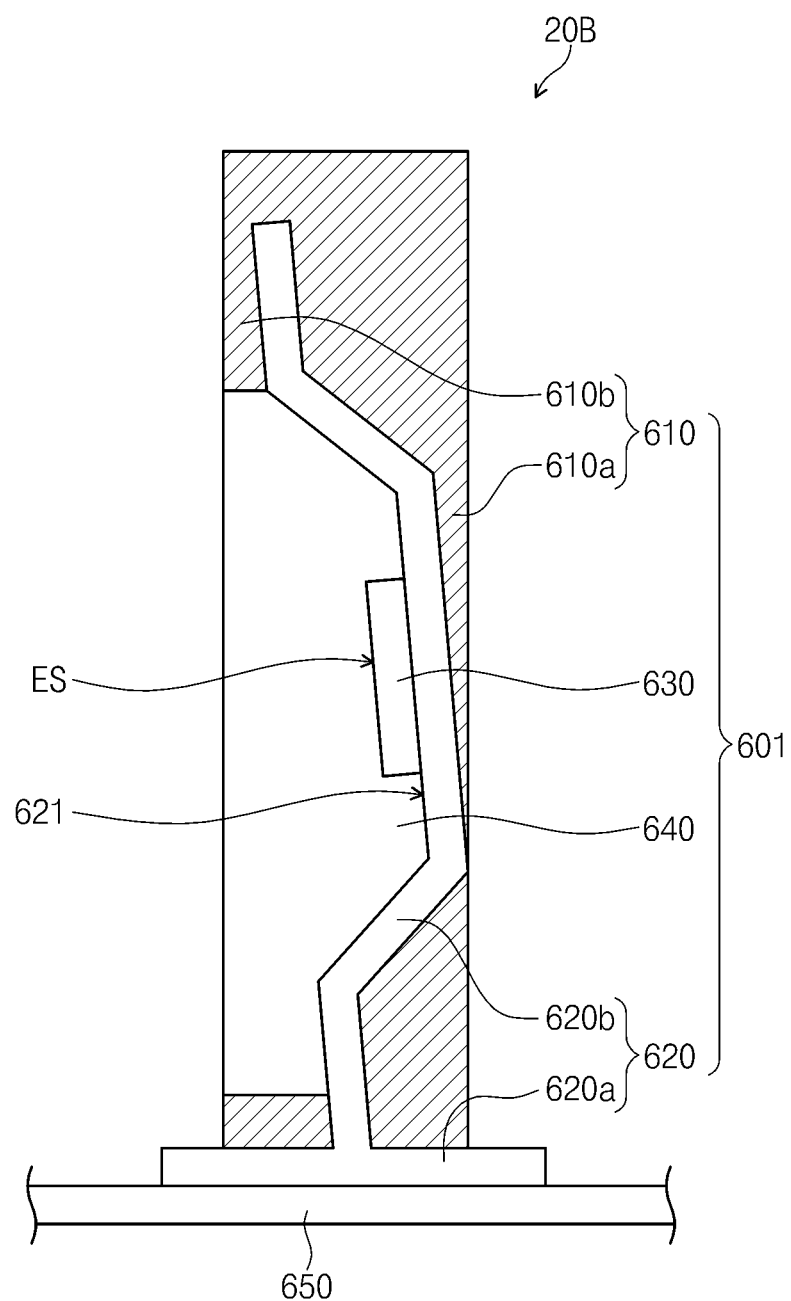
FIG. 5 is an enlarged cross-sectional view of another exemplary embodiment of a light source part shown in FIG. 1 according to the invention.

FIG. 5 is an enlarged cross-sectional view of another exemplary embodiment of a light source part shown in FIG. 1 according to the invention. In the following description of the light source part 20B shown in FIG. 5, the same reference numerals will be assigned to the elements and structures identical to those of the light source shown in FIG. 4 and detailed description thereof will be omitted in order to avoid redundancy.

Referring to FIG. 5, the lead frame 620 includes a first frame 620a adjacent to the printed circuit board 650 and parallel to the printed circuit board 650, and a second frame 620b extending from the first frame 620a to mount the light source 630 thereon. The first frame 620a protrudes out of the housing 610 and makes contact with the printed circuit board 650 to support the light source unit 601 and to electrically connect the light source 630 to the printed circuit board 650. The second frame 620b has a recess and the light source 630 is mounted in the recess. A mounting surface 621 of the recess for the light source 630 is not perpendicular to the printed circuit board 650, but inclined with respect to the printed circuit board 650. In detail, the mounting surface 621 of the recess for the light source 630 is inclined toward the printed circuit board 650.

The housing 610 includes a receiving part 610a to receive the light source 630 and the lead frame 620, and a support part 610b substantially perpendicularly extending from the receiving part 610a to cover at least a portion of the lead frame 620 and to support the lead frame 620. Different from FIG. 4, the support part 610b is substantially perpendicular to the printed circuit board 650. In detail, the mounting surface 621 of the recess for the light source 630 in the second frame 620b is inclined with respect to an outer surface of the support part 610b.

Although the support part 610b of the housing 610 is substantially perpendicular to the printed circuit board 650, the mounting surface 621 of the recess for the light source 630 in the second frame 620b of the lead frame 620 is inclined with respect to the outer surface of the support part 610b. Thus, the light emitted from the light source 630 is inclined toward the printed circuit board 650. In addition, since the housing 610 of the light source unit 601 is perpendicular to the printed circuit board 650, the light source unit 601 can be easily mounted on the printed circuit board 650.

Figure 6A:
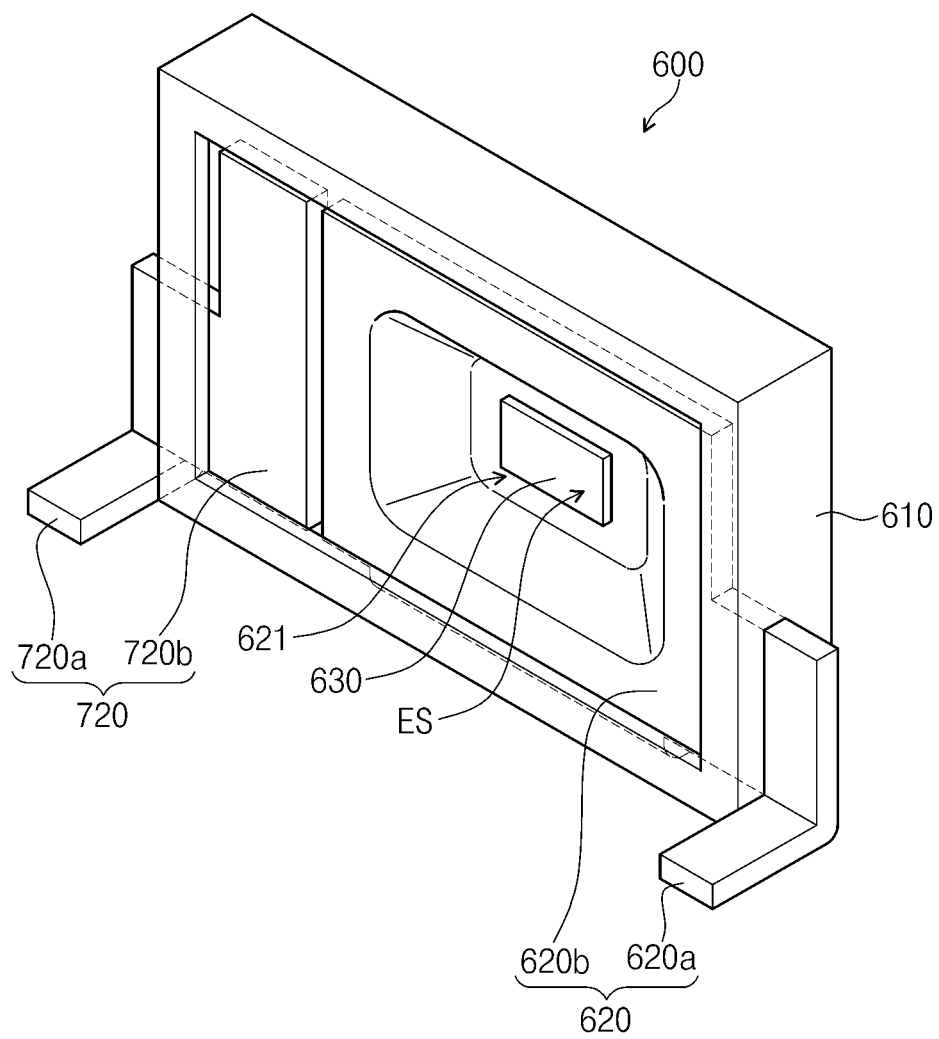
FIG. 6A is a front perspective view of another exemplary embodiment of a light source unit shown in FIG. 1 according to the invention.
Figure 6B:
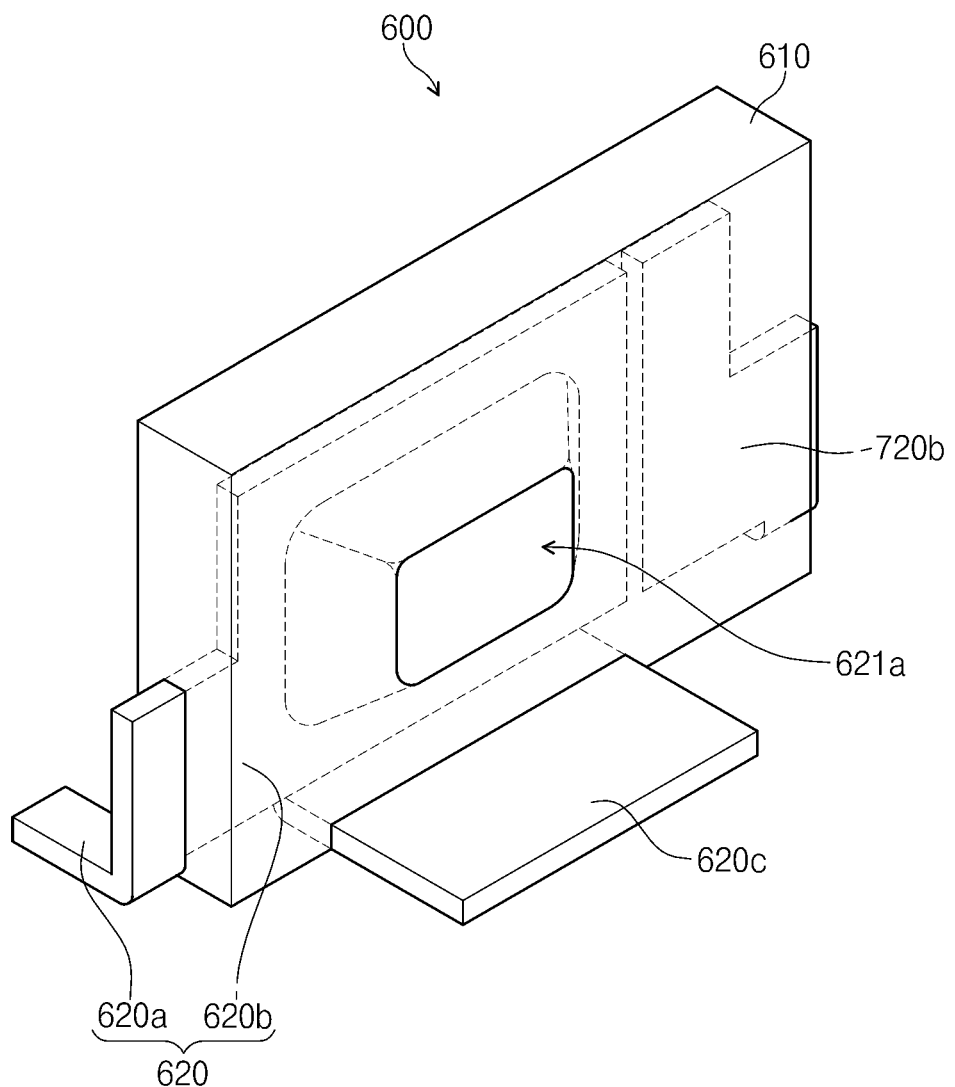
FIG. 6B is a rear perspective view of the light source unit shown in FIG. 6A.

FIG. 6A is a front perspective view of another exemplary embodiment of a light source unit shown in FIG. 1 according to the invention, and FIG. 6B is a rear perspective view of the light source unit shown in FIG. 6A.

Referring to FIGS. 6A and 6B, the light source unit 600 includes the light source 630 to generate the light, lead frames 720 and 620 to mount the light source 630 thereon such that the light source 630 can be connected to a printed circuit board (not shown), and the housing 610 to receive the light source 630 and the lead frames 720 and 620 therein.

The light source 630 may be a light emitting diode including two electrodes receiving voltages having polarities different from each other to generate the light according to the voltages applied to the two electrodes. In general, the emitting surface ES of the light source unit 600 is the same as the emitting surface ES of the light source 630.

Although not shown in the drawings, as shown in FIGS. 4 and 5, the emitting surface ES of the light source 630 is inclined toward the printed circuit board. In addition, the light source unit 600 is inclined with respect to the printed circuit board and the extension line of the normal line of the emitting surface ES crosses an extension surface of the printed circuit board.

Referring again to FIGS. 6A and 6B, the lead frames 720 and 620 are divided into first and second lead frames 720 and 620 connected to the two electrodes of the light source 630, respectively, and spaced apart from each other.

The first lead frame 720 includes a first frame 720a adjacent to the printed circuit board and parallel to the printed circuit board, and a second frame 720b extending from the first frame 720a and connected to the light source 630. The first frame 720a and the second frame 720b together form a single unitary indivisible first lead frame 720, as indicated by the dotted line portions in FIGS. 6A and 6B. The second lead frame 620 includes a first frame 620a adjacent to the printed circuit board and parallel to the printed circuit board, and a second frame 620b extending from the first frame 620a to mount the light source 630 thereon. The first frame 620a and the second frame 620b together form a single unitary indivisible second lead frame 620.

The first frames 720a and 620a of the first and second lead frames 720 and 620 protrude out of the housing 610 and contact the printed circuit board to support the light source unit 600 and to electrically connect the light source 630 to the printed circuit board. In detail, the first frames 720a and 620a protrude in the light emitting direction of the light source unit 600 to support the light source unit 600.

The second frame 720b of the first lead frame 720, which extends from the first frame 720a of the first lead frame 720 and is substantially perpendicular to the first frame 720a of the first lead frame 720, is connected to one of the electrodes of the light source 630.

The second frame 620b of the second lead frame 620 has a recess and the light source 630 is mounted in the recess. A mounting surface 621 of the recess for the light source 630 is not perpendicular to the printed circuit board 650, but inclined with respect to the printed circuit board 650. In detail, the mounting surface 621 of the recess for the light source 630 is inclined toward the printed circuit board 650 in the direction of the emitting surface ES.

The housing 610 receives the light source 630 and the first and second lead frames 720 and 620. The housing 610 has an opening to expose a surface 621a opposite to the mounting surface 621 of the recess for the light source 630 in the second frame 620b of the second lead frame 620. Since the surface 621a, which is opposite to the mounting surface 621 of the recess for the light source 630 in the second lead frame 620, is exposed to outside of the light source unit 600, heat generated from the light source 630 can be easily dissipated to the outside.

The second lead frame 620 may further include a third frame 620c. The third frame 620c is adjacent to the printed circuit board, parallel to the printed circuit board and extends from the second frame 620b of the second lead frame 620. The third frame 620c protrudes in the direction opposite to the light emitting direction of the light source unit 600. In detail, the third frame 620c protrudes in opposition to the first frames 720a and 620a of the first and second lead frames 720 and 620 to support the light source unit 600. The first frames 720a and 620a and the third frame 620c support the light source unit 600 in the light emitting direction of the light source unit 600 and in the direction opposite to the light emitting direction of the light source unit 600, so that the light source unit 600 can be effectively supported. The first to third frames 620a to 620c together form a single unitary indivisible second lead frame 620.

When viewed from the top, the area of the third frame 620c is larger than the sum of the areas of the first and second lead frames 720 and 620 and the first frames 720a and 620a. In detail, when viewed from the top, the area of the first and second lead frames 720 and 620 protruding in the light emitting direction may be smaller than the area of the second lead frame 620 protruding in the direction opposite to the light emitting direction. When the area of the third frame 620c is increased when viewed from the top, the light emitting direction of the light source 630 may not be directed to the direction opposite to the printed circuit board even if external force is applied to the light source unit 600.

According to an alternative embodiment of the invention, the first frames 720a and 620a of the first and second lead frames 720 and 620 may not protrude from the housing 610 in the light emitting direction of the light source 630.

Similar to FIGS. 4 and 5, the mounting surface 621 of the recess for the light source 630 in the second frame 620b of the second lead frame 620 in FIGS. 6A and 6B is inclined toward the printed circuit board in the light emitting direction of the light source unit 600. Thus, when the light source 630 is mounted on the second lead frame 620, the emitting surface ES of the light source 630 is inclined toward the printed circuit board.

Figure 7A:
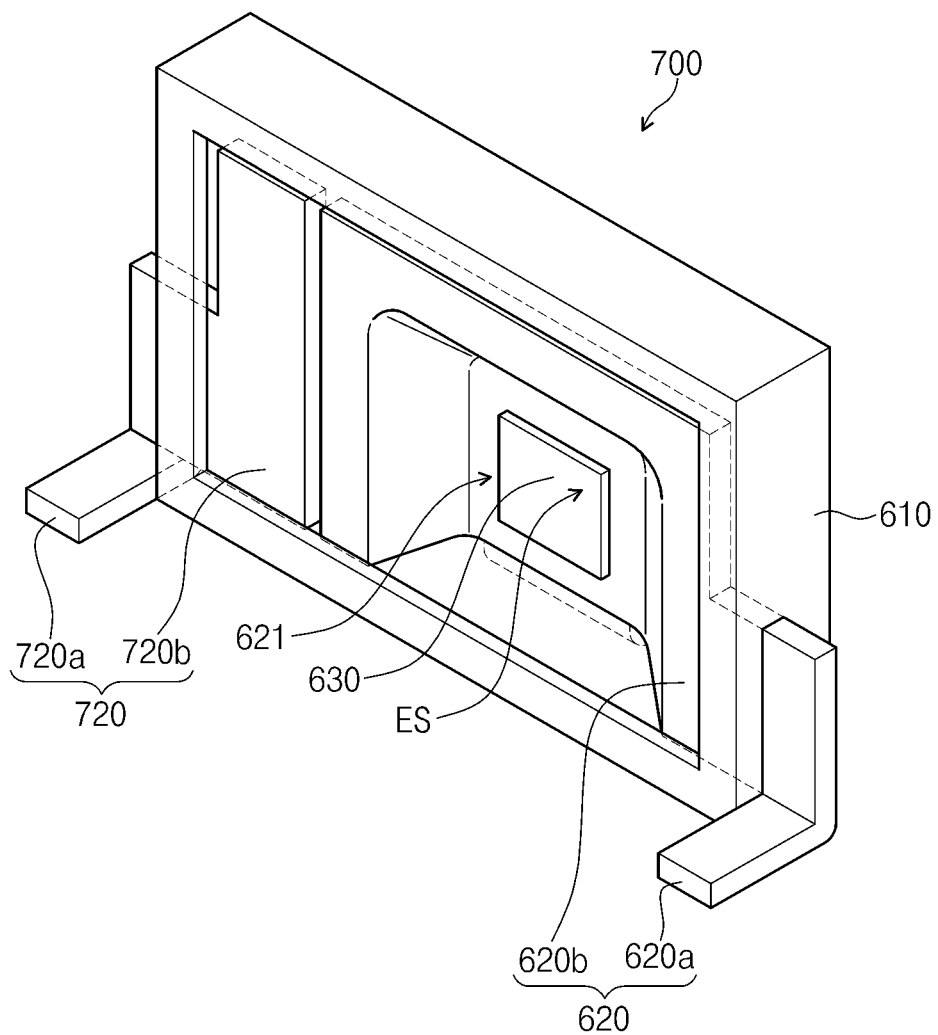
FIG. 7A is a front perspective view of still another exemplary embodiment of a light source unit shown in FIG. 1 according to the invention.
Figure 7B:
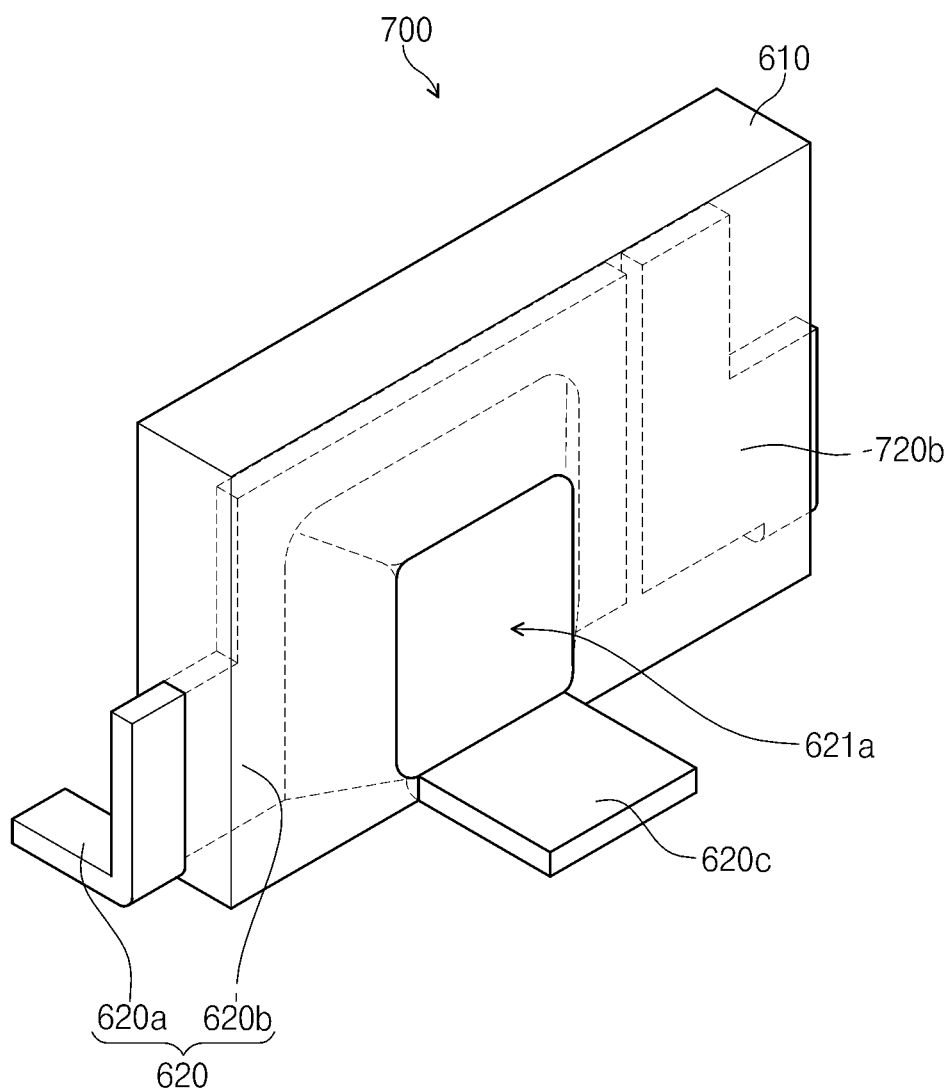
FIG. 7B is a rear perspective view of the light source unit shown in FIG. 7A.

FIG. 7A is a front perspective view of still another exemplary embodiment of a light source unit shown in FIG. 1 according to the invention, and FIG. 7B is a rear perspective view of the light source unit shown in FIG. 7A. In the following description of the light source unit shown in FIGS. 7A and 7B, the same reference numerals will be assigned to the elements and structures identical to those of the light source shown in FIGS. 6A and 6B and detailed description thereof will be omitted in order to avoid redundancy.

Referring to FIGS. 7A and 7B, the light source unit 700 includes the light source 630 to generate the light, the lead frames 720 and 620 to mount the light source 630 thereon such that the light source 630 can be connected to a printed circuit board (not shown), and the housing 610 to receive the light source 630 and the lead frames 720 and 620 therein. The lead frames 720 and 620 are divided into the first and second lead frames 720 and 620 connected to the two electrodes of the light source 630, respectively, and spaced apart from each other.

Different from FIGS. 6A and 6B, the recess of the second frame 620b of the second lead frame 620 extends to the third frame 620c in FIGS. 7A and 7B. In other words, the surface 621a, which is opposite to the mounting surface 621 for the light source 630 in the second frame 620b of the second lead frame 620 is connected to an upper surface of the third frame 620c and exposed to an outside of the light source unit 700. The surface 621a, which is opposite to the mounting surface 621 for the light source 630 in the second frame 620b of the second lead frame 620, may dissipate heat generated from the light source 630, so the heat dissipation efficiency can be improved by effectively increasing the area of the surface 621a. The first to third frames 620a to 620c together form a single unitary indivisible second lead frame 620, as indicated by the dotted lines in FIGS. 7A and 7B.

Similar to FIGS. 4 and 5, the mounting surface 621 of the recess for the light source 630 in the second frame 620b of the second lead frame 620 in FIGS. 7A and 7B is inclined toward the printed circuit board in the light emitting direction of the light source unit 600. Thus, when the light source 630 is mounted on the second lead frame 620, the emitting surface ES of the light source 630 is inclined toward the printed circuit board.

Figure 8:
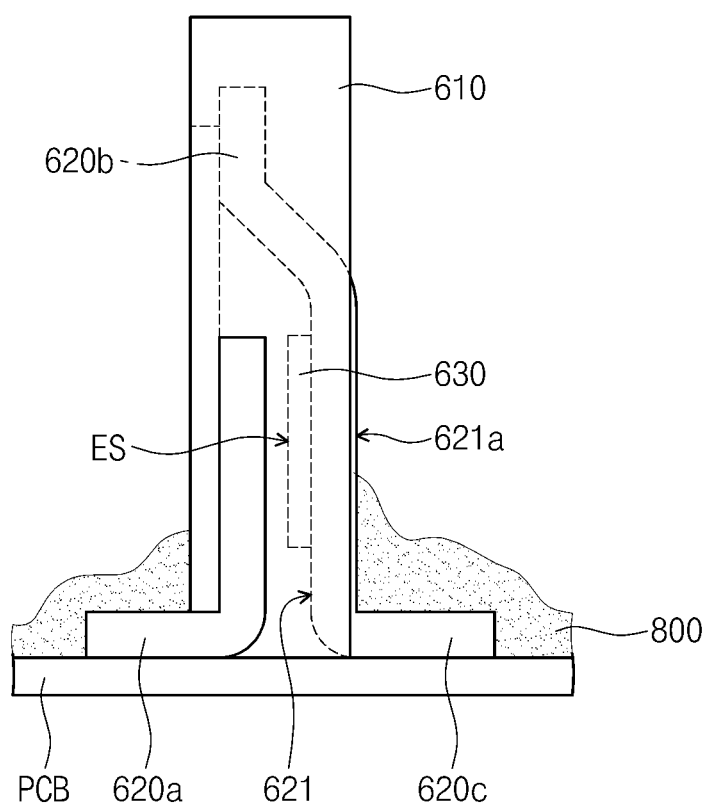
FIG. 8 is a cross-sectional view showing a light source unit of FIGS. 7A and 7B mounted on a printed circuit board.

FIG. 8 is a cross-sectional view showing the light source unit 700 of FIGS. 7A and 7B mounted on a printed circuit board.

A solder 800 overlaps the first frame 620a and the third frame 620c of the light source unit 700, and the light source unit 700 is electrically connected to the printed circuit board PCB through the solder 800. The solder 800 is not only coated on the first frame 620a and the third frame 620c, but is also coated on a portion of the second frame 620b of the second lead frame 620 to overlap a portion of the surface 621a opposite to the mounting surface 621 for the light source 630 in the second frame 620b of the second lead frame 620. The surface 621a opposite to the mounting surface 621 for the light source 630 may dissipate the heat generated from the light source 630 to the outside of the light source unit 700. Since the solder 800 covers at least a potion of the surface 621a opposite to the mounting surface 621 for the light source 630, the heat can be dissipated through the solder 800 and the heat dissipation efficiency can be further improved.

Figure 9:
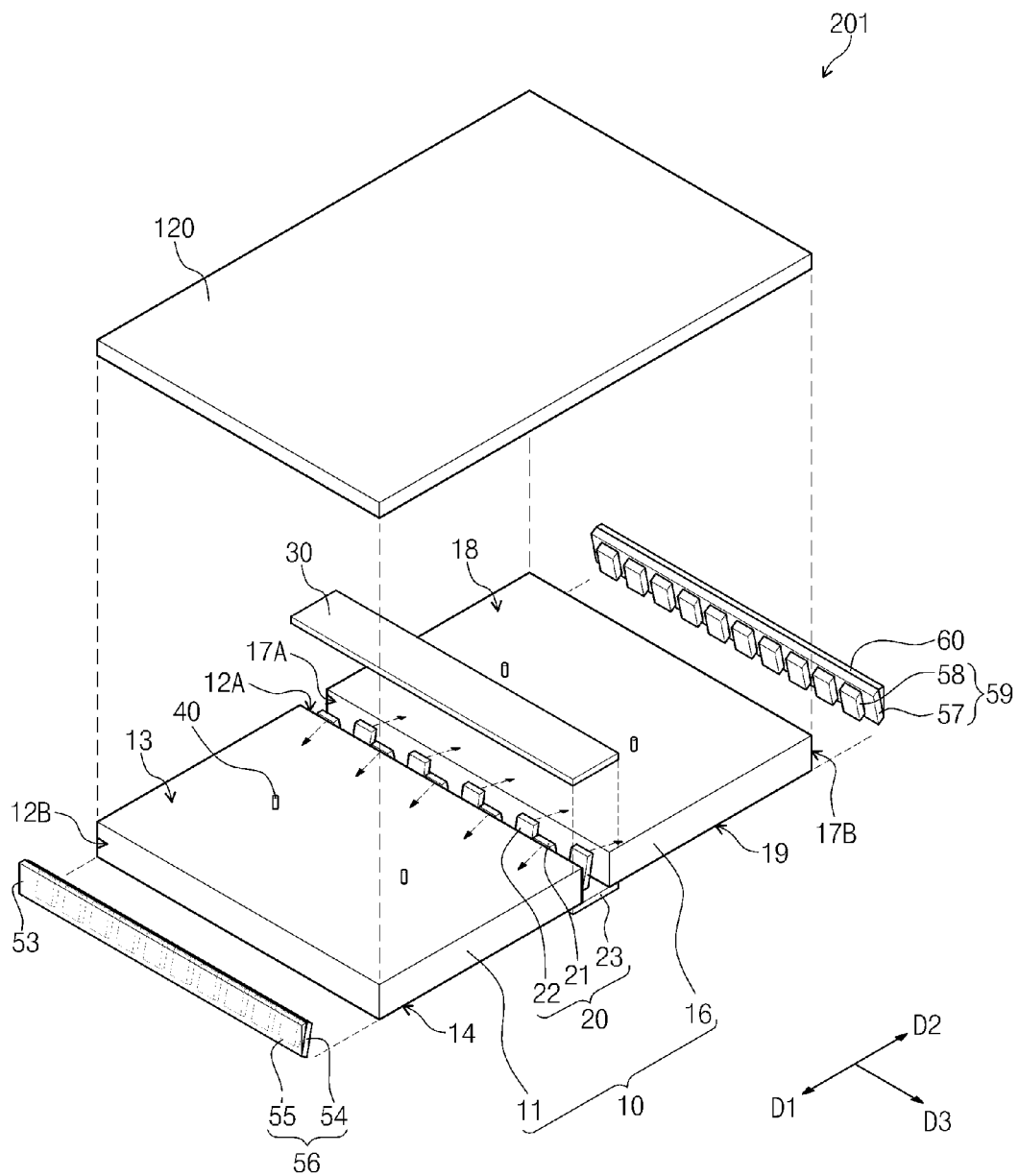
FIG. 9 is an exploded perspective view showing another exemplary embodiment of the relationship among the first to third light source parts, the light guide plate and the diffusion plate according to the invention.
Figure 10:
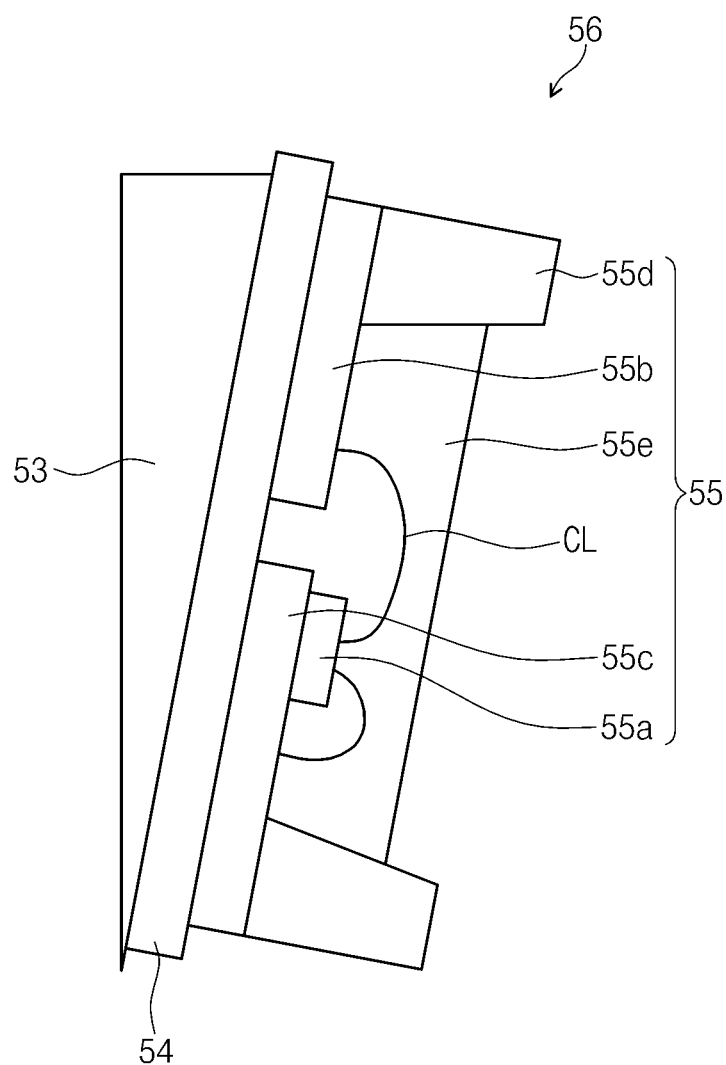
FIG. 10 is a side cross-sectional view showing the light source part shown in FIG. 9.

FIG. 9 is an exploded perspective view showing another exemplary embodiment of the relationship among the first to third light source parts, the light guide plate and the diffusion plate according to the invention, and FIG. 10 is a side cross-sectional view showing an exemplary embodiment of the light source part of FIG. 9. In the following description of FIG. 9, the same reference numerals will be assigned to the elements and structures identical to those of FIG. 2 and detailed description thereof will be omitted in order to avoid redundancy.

Referring to FIGS. 9 and 10, a backlight unit 201 includes the first light source part 20, a second light source part 56, a third light source part 59, the light guide plate 10 including the first sub-light guide plate 11 and the second sub-light guide plate 16, the diffusion member 30, and the diffusion plate 120.

The light guide plate 10 includes the first and second sub-light guide plates 11 and 16 spaced apart from each other and arranged in the first direction D1. The diffusion plate 120 is disposed on the first and second sub-light guide plates 11 and 16. The first light source part 20 is provided between the first and second sub-light guide plates 11 and 16. The first light source part 20 includes the first printed circuit board 23, the first light source units 21, and the second light source units 22. When viewed from the top, the light generated from the first light source units 21 substantially travels in the first direction D1 so that the light is supplied to the first sub-light guide plate 11 through the first incident surface 12A. In addition, the light generated from the second light source units 22 substantially travels in the second direction D2 opposite to the first direction D1, so that the light is supplied to the second sub-light guide plate 16 through the third incident surface 17A.

Referring to FIGS. 9 and 10, the second light source part 56 is disposed adjacent to the second incident surface 12B to supply the light toward the first sub-light guide plate 11. The second light source part 56 includes a second printed circuit board 54, a first inclined structure 53 and third light source units 55.

The second printed circuit board 54 longitudinally extends in the third direction D3 along the second incident surface 12B while facing the second incident surface 12B. The first inclined structure 53 faces the third light source units 55 while interposing the second printed circuit board 54 therebetween. In the illustrated exemplary embodiment, for instance, the first inclined structure 53 has a prism shape longitudinally extending in the third direction D3. The first inclined structure 53 allows the second printed circuit board 54 and the third light source units 55 to be inclined in the direction opposite to the display panel 400 (see, FIG. 1), that is, toward the opposite surface 14 of the first sub-light guide plate 11.

The third light source units 55 are electrically connected to the second printed circuit board 54 and arranged on the second printed circuit board 54 in the third direction D3. When viewed from the top, the light generated from the third light source units 55 substantially travels in the second direction D2, so the light is supplied to the first sub-light guide plate 11 through the second incident surface 12B.

In detail, each third light source unit 55 includes a light source 55a, first and second lead frames 55b and 55c and a housing 55d. The first and second lead frames 55b and 55c are spaced apart from each other and parallel to the printed circuit board 54. The light source 55a is mounted on the second lead frame 55c, and the first and second lead frames 55b and 55c are electrically connected to the light source 55a through a conductive line CL, so that the printed circuit board 54 is electrically connected to the light source 55a.

The housing 55d receives the first and second lead frames 55b and 55c and the light source 55a therein. A transparent filler 55e may be provided in the housing 55d.

The third light source part 59 is disposed adjacent to the fourth incident surface 17B to supply the light toward the second sub-light guide plate 16. The third light source part 59 includes a third printed circuit board 57, a second inclined structure 60 and fourth light source units 58.

The third printed circuit board 57 longitudinally extends in the third direction D3 along the fourth incident surface 17B while facing the fourth incident surface 17B. The second inclined structure 60 faces the fourth light source units 58 while interposing the third printed circuit board 57 therebetween. In the illustrated embodiment, for instance, the second inclined structure 60 has a prism shape longitudinally extending in the third direction D3. The second inclined structure 60 allows the third printed circuit board 57 and the fourth light source units 58 to be inclined in the direction opposite to the display panel 400 (see, FIG. 1), that is, toward the opposite surface 19 of the second sub-light guide plate 16.

The fourth light source units 58 are electrically connected to the third printed circuit board 57 and aligned on the third printed circuit board 57 in the third direction D3 and parallel to each other. When viewed from the top, the light generated from the fourth light source units 58 substantially travels in the first direction D1, so the light is supplied to the second sub-light guide plate 16 through the fourth incident surface 17B.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
a light guide plate comprising an incident surface, an exit surface and an opposite surface which is opposite to the exit surface, the light guide plate guiding a light incident into the incident surface toward the exit surface;
a printed circuit board;
a light source unit on the printed circuit board and comprising:
a light source which generates light and is adjacent to the incident surface, wherein the light source includes an emitting surface inclined with respect to the incident surface of the light guide plate, and an extension line of a normal line of the emitting surface passes through the opposite surface of the light guide plate, such that the light from the light source is incident into the incident surface of the light guide plate while being inclined toward the opposite surface of the light guide plate;
a lead frame which electrically connects the printed circuit board to the light source, wherein the lead frame comprises:
a first frame adjacent to the printed circuit board and parallel to the printed circuit board; and
a second frame which extends from the first frame, the light source on a mounting surface of the second frame,
wherein the mounting surface of the second frame is recessed and inclined at a non-perpendicular angle with respect to an extension surface of the printed circuit board; and
a housing which receives the lead frame and the light source therein, exposes the emitting surface of the light source and contacts the lead frame, and
a display panel which displays an image using the light emitted from the exit surface of the light guide plate.

2. The display apparatus of claim 1, wherein the normal line of the emitting surface forms an angle θ with respect to a normal line of the incident surface in a range of 0°<θ<45°.

3. The display apparatus of claim 1, wherein the light source comprises a light emitting diode.

4. The display apparatus of claim 1, wherein
the printed circuit board is parallel to the exit surface of the light guide plate, and
the light source is inclined with respect to the printed circuit board, and the extension line of the normal line of the emitting surface crosses an extension surface of the printed circuit board.

5. The display apparatus of claim 4, wherein the light source unit further comprises:
a first lead frame which electrically connects the printed circuit board to a first electrode of the light source;
a second lead frame which is spaced apart from the first lead frame, the light source on the second lead frame, and electrically connects the printed circuit board to a second electrode of the light source; and
the housing which receives the first and second lead frames and the light source therein.

6. The display apparatus of claim 5,
wherein each of the first and second lead frames comprises:
the first frame adjacent to the printed circuit board and parallel to the printed circuit board; and
the second frame which extends from the first frame and is connected to the light source, and wherein the first frames protrude from the housing toward the emitting surface.

7. The display apparatus of claim 6, wherein
the light source is on the second frame of the second lead frame, and
the first frame of the second lead frame also protrudes from the housing in a direction opposite to the emitting surface.

8. The display apparatus of claim 7, wherein, when viewed from a top, an area of the first frame of the second lead frame protruding toward the emitting surface is smaller than an area of the first frame of the second lead frame protruding in the direction opposite to the emitting surface.

9. The display apparatus of claim 6, wherein
the second lead frame comprises the recess including the mounting surface, the light source in the recess and on the mounting surface, and
the housing comprises an opening which exposes a surface of the second frame of the second lead frame which is opposite to the mounting surface of the recess.

10. The display apparatus of claim 9, wherein the recess extends to a region where the first and second frames of the second lead frame are connected to each other.

11. The display apparatus of claim 10, further comprising a solder which electrically connects the printed circuit board to the second lead frame, and at least a portion of the surface of the second frame of the second lead frame which is opposite to the mounting surface of the recess is overlapped by the solder.

12. The display apparatus of claim 5,
wherein each of the first and second lead frames comprises:
a first frame adjacent to the printed circuit board and parallel to the printed circuit board; and
a second frame which extends from the first frame and is connected to the light source, and
wherein the first frames only protrude from the housing in a direction opposite to the emitting surface.

13. The display apparatus of claim 1,
wherein the housing comprises:
a receiving part which receives the lead frame and the light source therein; and
a support part which perpendicularly extends from the receiving part, supports the lead frame and covers at least a portion of the lead frame, and
wherein an outer surface of the receiving part is parallel with the mounting surface of the second frame.

14. The display apparatus of claim 1,
wherein the housing comprises:
a receiving part which receives the lead frame and the light source therein; and
a support part which perpendicularly extends from the receiving part, supports the lead frame and covers at least a portion of the lead frame, and
wherein an outer surface of the receiving part is inclined with respect to the mounting surface of the second frame and is perpendicular to the printed circuit board.

15. A backlight unit comprising:
a light guide plate comprising an incident surface, an exit surface and an opposite surface which is opposite to the exit surface, and guiding a light incident into the incident surface toward the exit surface;
a printed circuit board; and
a light source unit on the printed circuit board and comprising:
a light source which generates light and is adjacent to the incident surface, wherein the light source includes an emitting surface inclined with respect to the incident surface of the light guide plate, and an extension line of a normal line of the emitting surface passes through the opposite surface of the light guide plate, such that the light from the light source is incident into the incident surface of the light guide plate while being inclined toward the opposite surface of the light guide plate
a lead frame which electrically connects the printed circuit board to the light source, wherein the lead frame comprises:
a first frame adjacent to the printed circuit board and parallel to the printed circuit board; and
a second frame which extends from the first frame, the light source on a mounting surface of the second frame,
wherein the mounting surface of the second frame is recessed and inclined at a non-perpendicular angle with respect to an extension surface of the printed circuit board; and
a housing which receives the lead frame and the light source therein, exposes the emitting surface of the light source and contacts the lead frame.

\* \* \* \* \*